(12) United States Patent
Rabhi

(10) Patent No.: US 11,326,509 B2
(45) Date of Patent: May 10, 2022

(54) VALVE IGNITION PRECHAMBER WITH A REVERSED DIRECTON OF COMBUSTION

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 0 days.

(21) Appl. No.: 17/173,953

(22) Filed: Feb. 11, 2021

(65) Prior Publication Data

US 2021/0254543 A1 Aug. 19, 2021

Related U.S. Application Data

(60) Provisional application No. 62/977,900, filed on Feb. 18, 2020.

(30) Foreign Application Priority Data

Feb. 14, 2020 (FR) ........................................ 2001508

(51) Int. Cl.
*F02B 19/02* (2006.01)
*F02B 19/12* (2006.01)
*F02B 19/10* (2006.01)
*F02B 19/18* (2006.01)

(52) U.S. Cl.
CPC .......... *F02B 19/02* (2013.01); *F02B 19/1014* (2013.01); *F02B 19/12* (2013.01); *F02B 19/18* (2013.01)

(58) Field of Classification Search
CPC ...... F02B 19/02; F02B 19/1014; F02B 19/12; F02B 19/18; F02B 19/109
See application file for complete search history.

(56) References Cited

U.S. PATENT DOCUMENTS

| 5,570,665 A * | 11/1996 | Regueiro | ............... F01L 1/2405 123/90.55 |
| 5,924,402 A * | 7/1999 | Regueiro | ................ F02B 19/14 123/254 |
| 8,839,762 B1 * | 9/2014 | Chiera | .................... F02B 19/12 123/266 |
| 9,893,497 B2 * | 2/2018 | Chiera | .................... H01T 13/32 |
| 2015/0040845 A1 * | 2/2015 | Chiera | .................... F02B 19/18 123/445 |

(Continued)

FOREIGN PATENT DOCUMENTS

| FR | 3 061 743 | 7/2018 |
| FR | 3 085 718 | 3/2020 |
| WO | 2013/117857 | 8/2013 |

*Primary Examiner* — Xiao En Mo
(74) *Attorney, Agent, or Firm* — Nixon & Vanderhye

(57) ABSTRACT

The valve ignition prechamber (1) with a reversed direction of combustion includes a lamination cavity (6) in which opens a pilot charge injector (32), and said cavity (6) being connected to a combustion chamber (5) of an internal combustion engine by a lamination duct (7), which, when opened by a lamination valve (13), forms with the latter a torch-ignition prechamber while an inverter housing (93) containing an ignition pilot charge (27) and accommodating ignition means (11) is housed in the lamination cavity (6) with which it forms a late combustion volume, said housing (93) comprising a main ejection nozzle (94) which can emit a pre-ignition torch in the direction of the lamination duct (7), the volume swept by said torch forming an early combustion volume.

14 Claims, 8 Drawing Sheets

(56) References Cited

U.S. PATENT DOCUMENTS

| | | | |
|---|---|---|---|
| 2015/0068489 A1* | 3/2015 | Bunce | F02B 19/12 |
| | | | 123/262 |
| 2016/0069250 A1* | 3/2016 | Loetz | F02B 19/02 |
| | | | 123/292 |
| 2019/0234293 A1* | 8/2019 | Holzhammer | F01P 3/02 |
| 2020/0200068 A1* | 6/2020 | Schock | F02B 19/18 |

* cited by examiner

[Fig. 1]
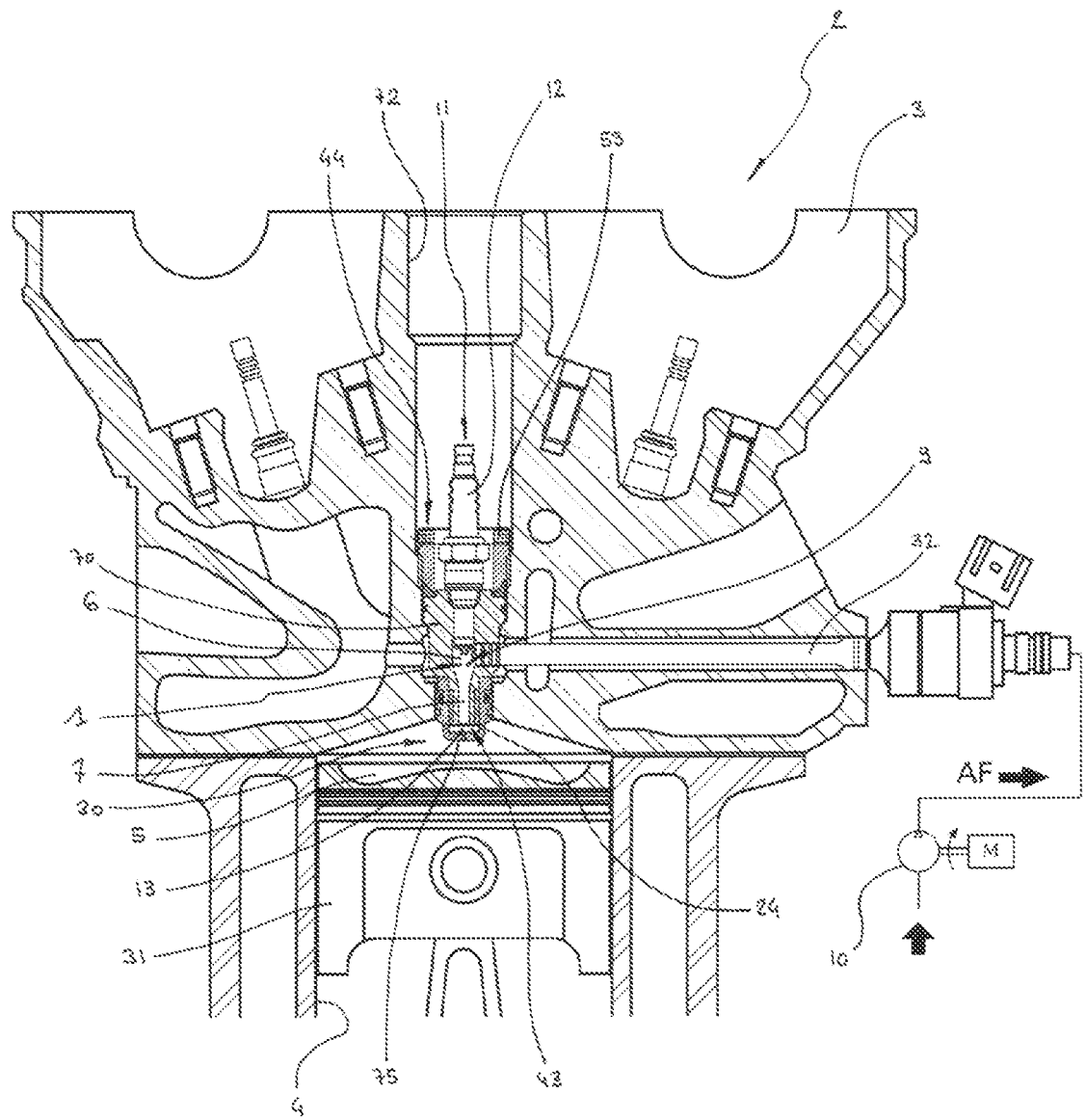

[Fig. 2]
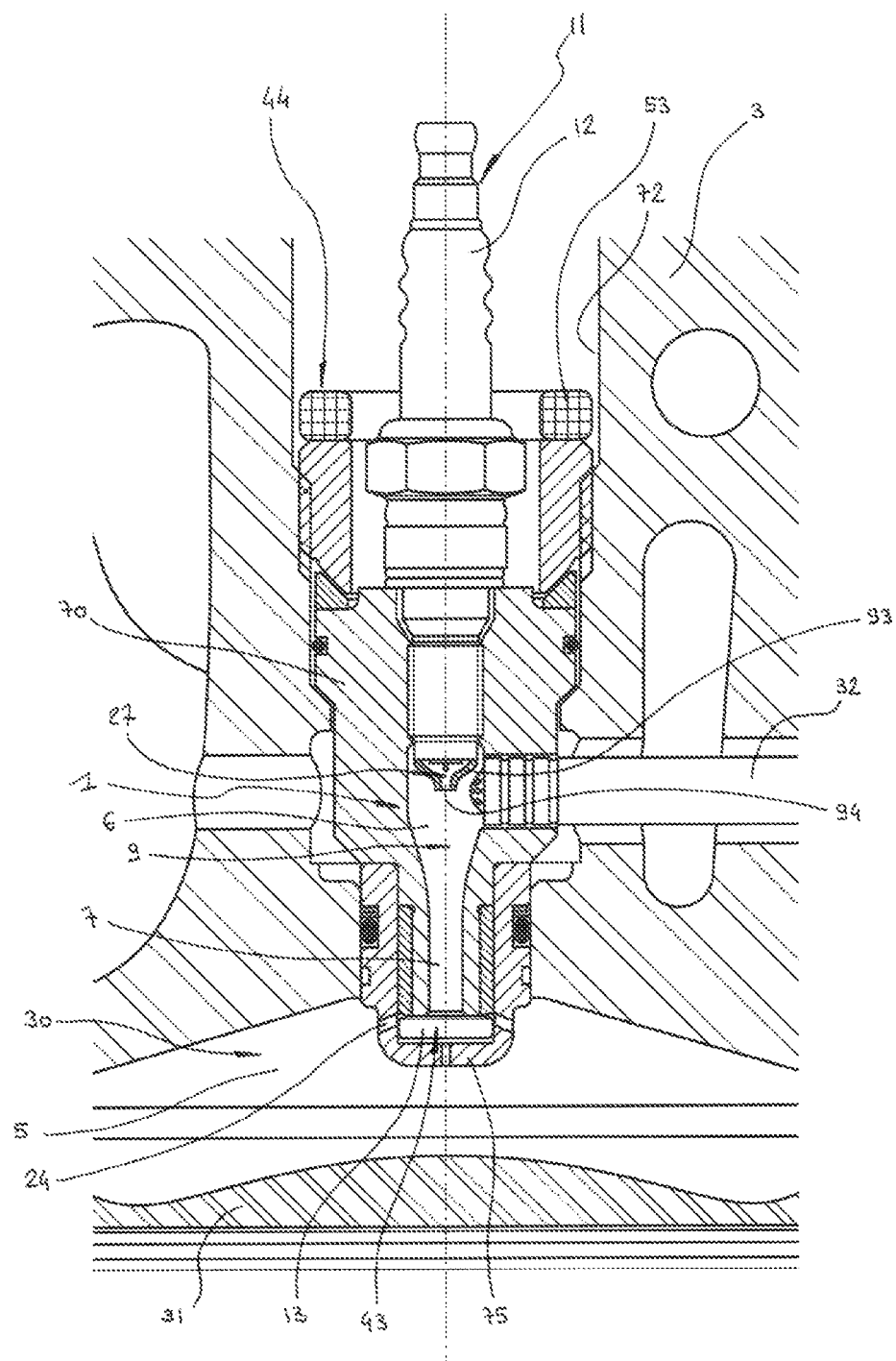

[Fig. 3]
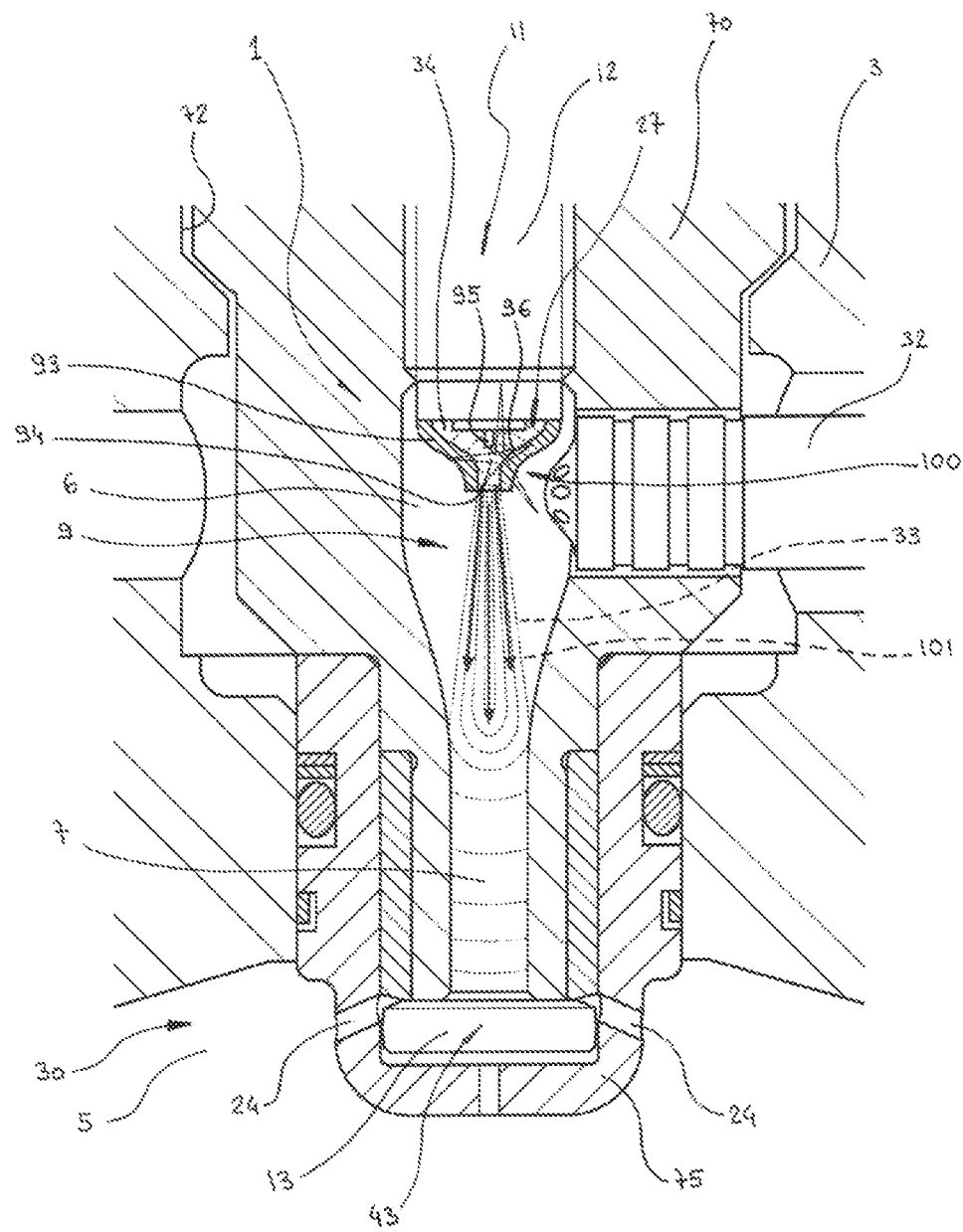

[Fig. 4]
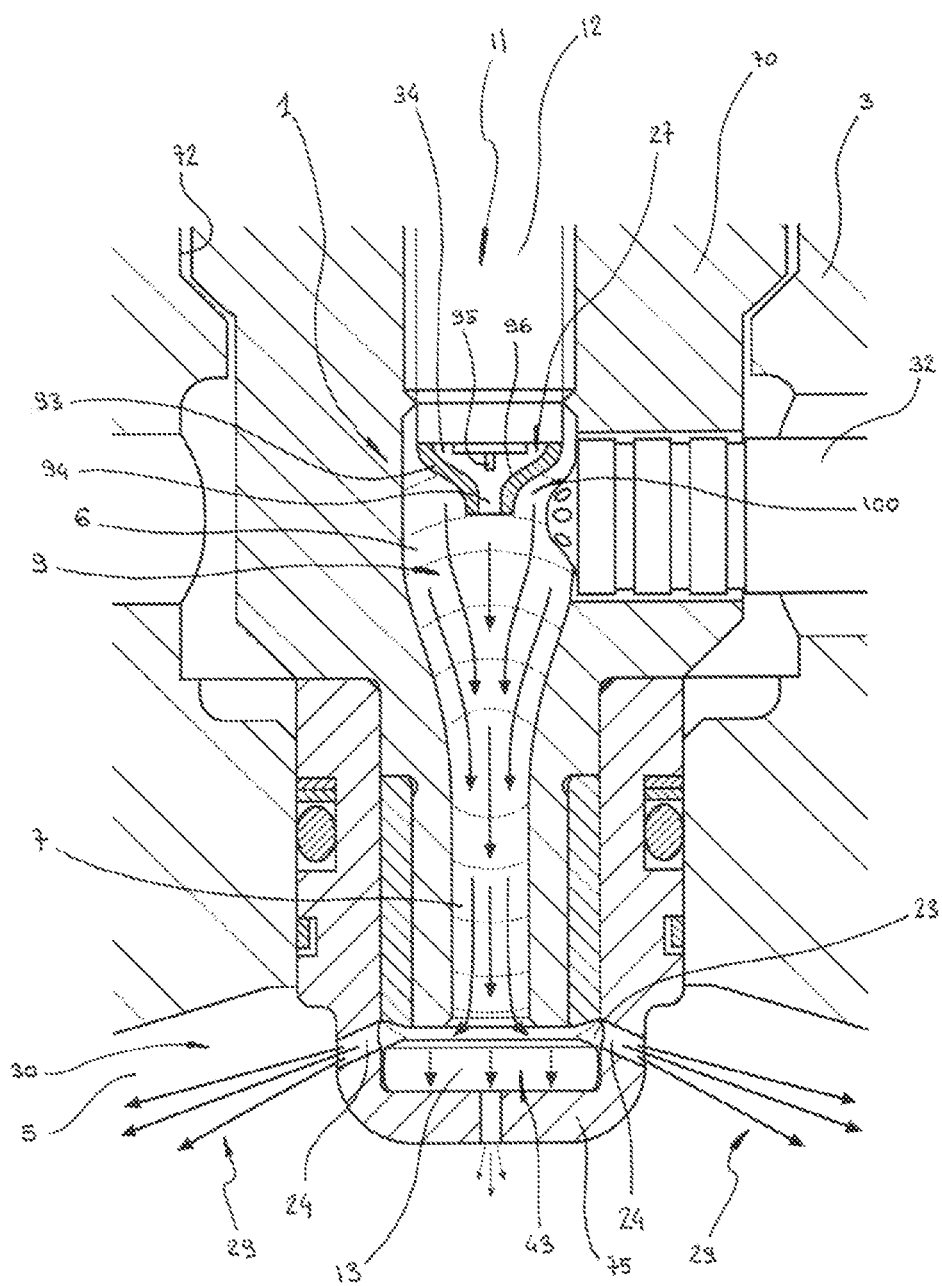

[Fig. 5]
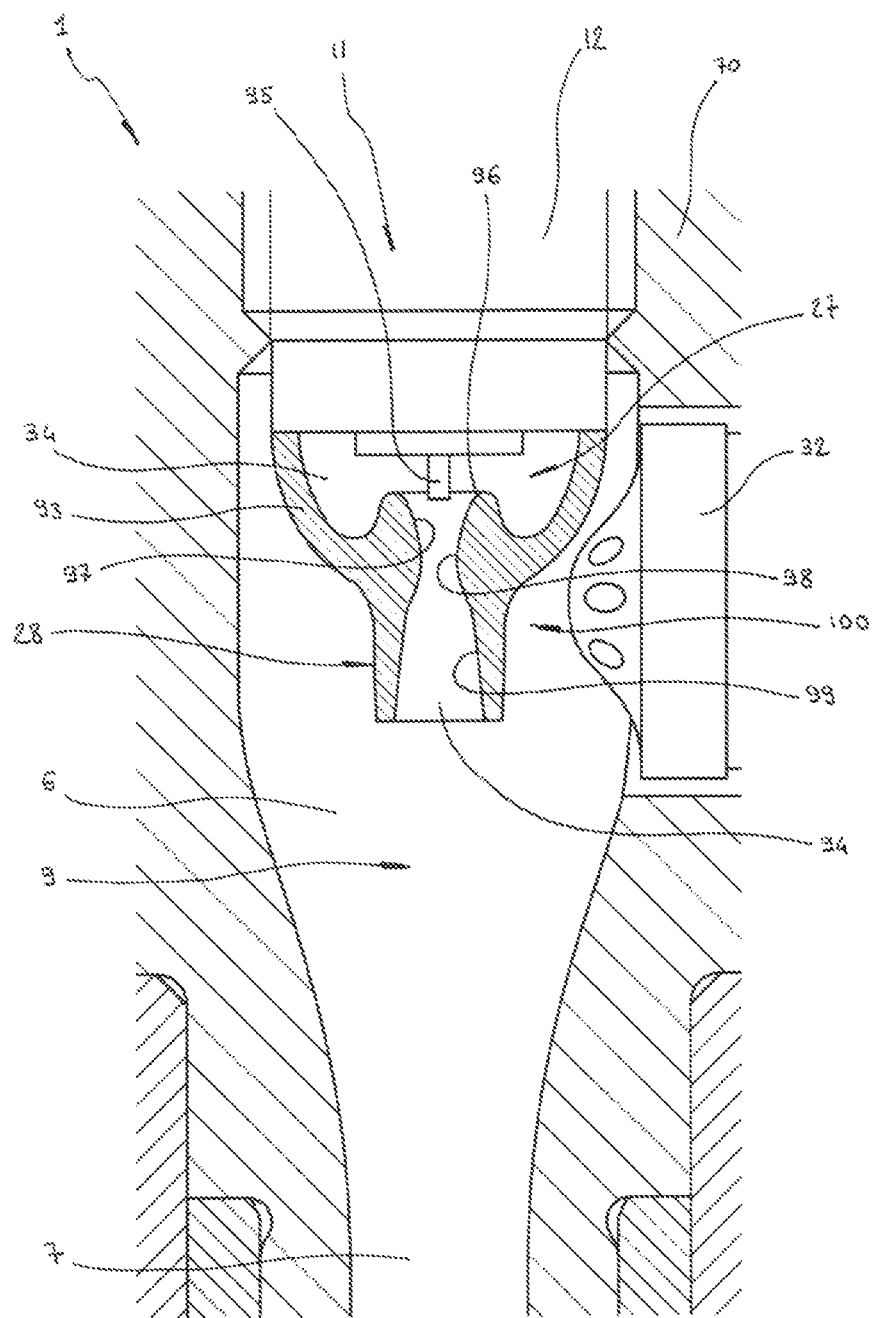

[Fig. 6]
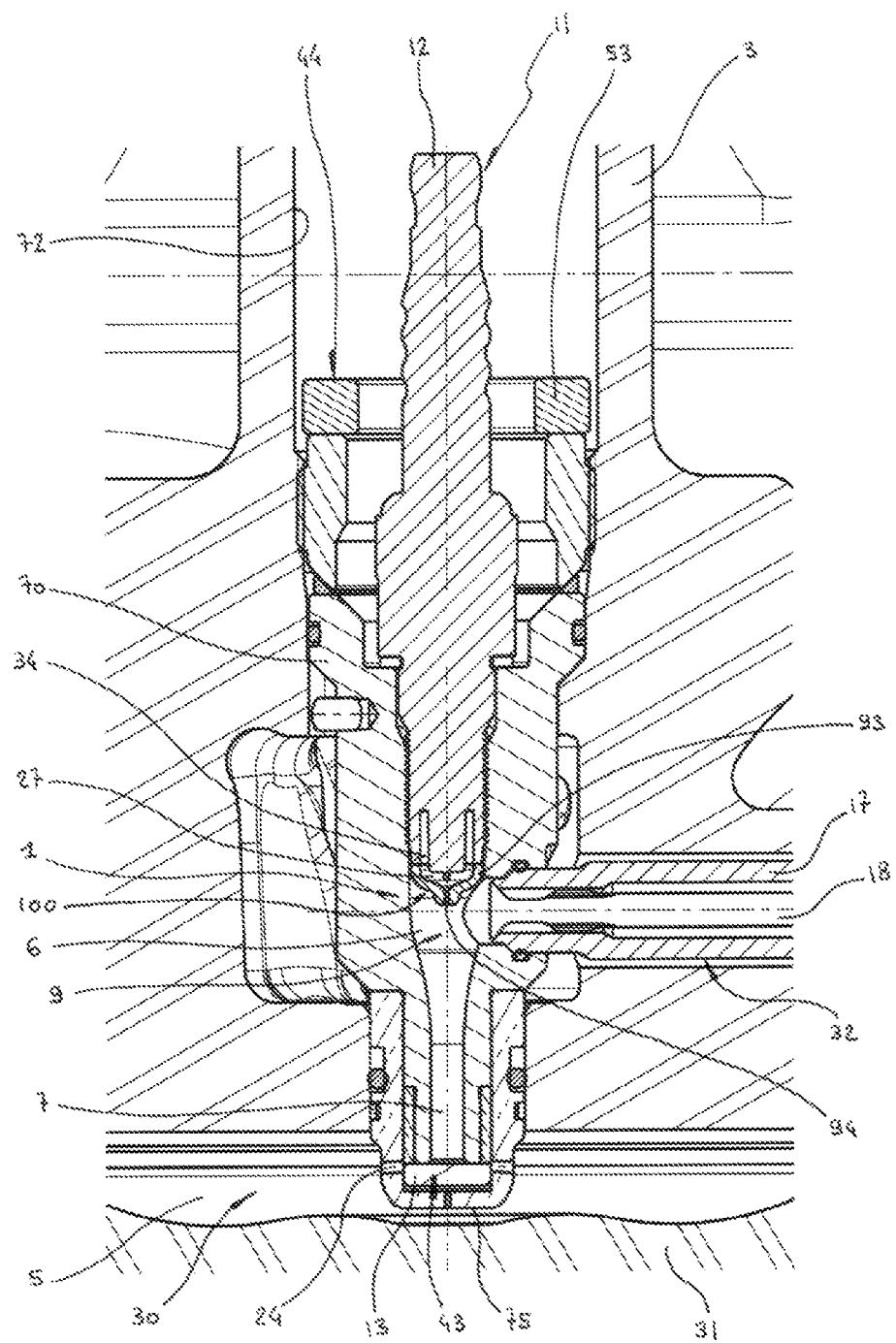

[Fig. 7]
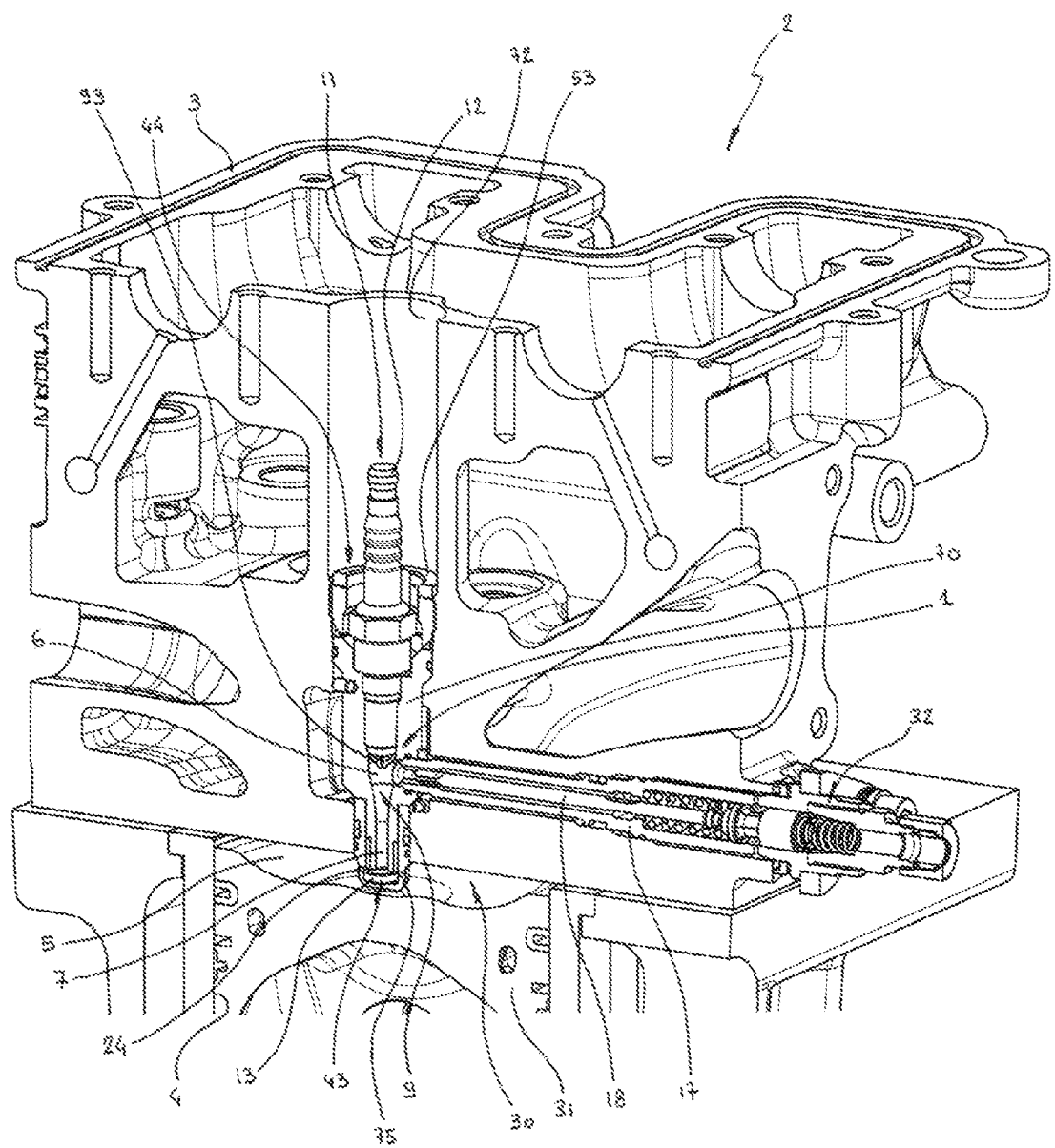

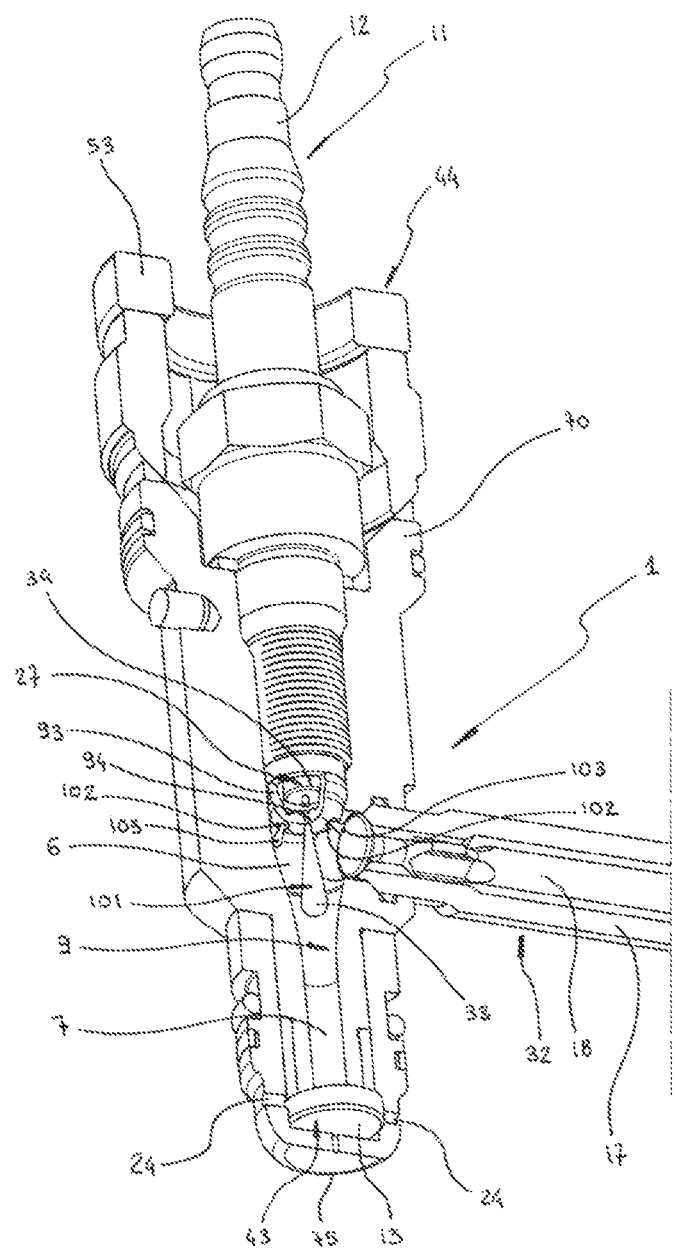
[Fig. 8]

VALVE IGNITION PRECHAMBER WITH A REVERSED DIRECTON OF COMBUSTION

This application claims priorities to French Patent Application No. 2001508 of Feb. 14, 2020, and U.S. Provisional Patent Application No. 62/977,900 of Feb. 18, 2020, the entire contents of which are hereby incorporated by reference.

The present invention relates to a valve ignition prechamber with a reversed direction of combustion, designed to provide high energy efficiency to internal combustion thermal engines with spark ignition.

The present invention forms an improvement to the valve ignition prechamber which is the subject of patent application FR 17 50264 of Jan. 12, 2017, published on Jul. 13, 2018 with the number FR 3,061,743, and being owned by the applicant.

The objective of said prechamber according to application FR 17 50264 is to ensure the ignition of a main charge previously introduced into the combustion chamber of a thermal internal combustion engine with spark ignition.

To this end, said prechamber can emit ignition torches into said combustion chamber. Said torches produce strong turbulence in their path while releasing a significant amount of heat.

This ignition mode allows the main charge to be greatly diluted with air or flue gases without compromising the combustion quality of said charge.

Diluting the main charge allows to increase the average efficiency of internal combustion engines, in particular because the latter then generate less pumping losses at low loads. In addition, once diluted, the main charge is on average cooler during its combustion and transfers less heat to the inner walls of the combustion chamber. Finally, when said charge is diluted with air, the thermodynamic coefficient—which is also called the "gamma coefficient"—of the gases which constitute said charge is more favorable to efficiency.

If the main charge is diluted with non-reactive exhaust gases, the sensitivity to engine knocking is reduced. As a result, the compression ratio of said engine can be increased, which increases the efficiency of the latter. Diluting the main charge with exhaust gases also helps to keep it stoichiometric despite dilution, and to post-process nitrogen oxides produced by the engine using a known three-way catalyst. This is very advantageous from a technical and economic standpoint because the devices for post-processing of nitrogen oxides operating in excess of oxygen are complex and expensive.

The objective of the valve ignition prechamber according to patent application FR 17 50264 is also to cause rapid combustion of the main charge. Rapidly burning said charge is favorable to the efficiency of the heat engine because isochoric combustion is theoretically ideal, which leads to a maximum effective volumetric expansion ratio of the gases.

A rapid combustion can be obtained from the valve ignition prechamber according to application FR 17 50264 without having to set the main charge in motion when it is introduced into the combustion chamber.

The main charge movements usually produced in the combustion chambers of automobile gasoline engines are known as "tumble", "swirl" and "squish". These movements ensure that sufficient residual turbulence remains when the ignition is triggered by the spark plug and in the region of the latter, said turbulence being essential to obtain a rapid combustion rate of the main charge.

While said movements do increase the rate of combustion, they have the disadvantage of forcing heat exchange between the main charge and the inner walls of the combustion chamber. However, these exchanges adversely affect the efficiency of internal combustion engines.

The turbulent torch ignition of hot gases ensures rapid combustion of the main charge without having to set the main charge in motion. The turbulence generated by the ignition torches is intense, localized, and short-lived, and only minimally forces heat exchange between the main charge and the inner walls of the combustion chamber.

This constitutes a further advantage of the turbulent torch emission prechamber ignition, said ignition being more favorable in efficiency than that by single spark plug found in mass produced automobile spark ignition combustion engines.

The advantages which have just been described are not, moreover, exclusively provided by the valve ignition prechamber according to patent application FR 17 50264, but also by the ignition prechambers in general.

These benefits are so important that many research programs have been devoted to ignition prechambers since the beginning of the twentieth century, with an intensification of research and development programs in automotive engines since the 1970s.

However, the prechambers developed so far are not yet applicable to mass-produced automotive engines.

This is where the invention described in patent application FR 17 50264 differs from the prior art, because it guarantees a steady, precise and efficient ignition of the main charge, over the entire operating range of the internal combustion thermal engine with controlled spark ignition which receives it. These conditions are necessary in order to be able to mass produce automotive engines with prechamber ignition.

To achieve this result, the valve ignition prechamber described in patent application FR 17 50264 comprises a lamination cavity arranged in the cylinder head of the internal combustion engine. Said cavity is connected by a lamination duct to the combustion chamber of said engine.

The lamination cavity receives, on the one hand, a spark plug known per se, and, on the other hand, a pilot charge injector which can inject into said cavity a pilot charge previously pressurized by means of compression.

Said pilot charge consists of an easily flammable combustive agent-fuel mixture, unlike the combustive agent-fuel mixture which forms the main charge and which, due to its dilution with air or with burnt gases, is more resistant to combustion. The ignition of the pilot charge is triggered by an electric arc produced by the spark plug.

The invention according to patent application FR 17 50264 differs from the prior art mainly in that it comprises a lamination valve which, depending on its position, either closes the lamination duct, or opens said duct to form with the latter a torch ignition prechamber.

When the lamination valve forms said torch ignition prechamber, the latter communicates simultaneously, on the one hand, with the lamination cavity, and, on the other hand, with the combustion chamber of the heat engine via gas ejection orifices.

According to patent application FR 17 50264, the position of the lamination valve is mainly controlled by the pressure difference between that prevailing in the lamination cavity and that prevailing in the combustion chamber of the internal combustion heat engine.

Constituted in this way, the valve ignition prechamber of patent application FR 17 50264 solves many problems associated with ignition prechambers.

Indeed, the passive or active ignition prechambers according to the prior art are for the moment mainly reserved for large-displacement industrial engines operating at fixed speed and load. Said prechambers are not yet suitable for mass-produced automobile engines which operate at variable speed and load.

Yet, ignition prechambers have a strong potential to reduce at low cost fuel consumption and carbon dioxide emissions from cars, and to address the environmental and energy challenges of road transport.

Also, for meeting the identified and nevertheless unsatisfied need to produce automotive engines with ignition prechamber, the valve ignition prechamber according to patent application FR 17 50264 has the characteristics necessary for the effective implementation of the prechamber ignition in motor vehicle spark-ignition engines which, notoriously, operate at variable speeds and loads.

The lamination valve which characterizes the said valve ignition prechamber prohibits, in particular, the mixing of the main charge consisting of a gas mixture which is difficult to ignite with the pilot charge which consists of a gas mixture which is easily ignited. Thus, the pilot charge remains intact and highly flammable, and can in all circumstances ensure a rapid and almost complete combustion of the main charge.

The pilot charge being, according to patent application FR 17 50264, pre-prepared before being injected in the gaseous state into the lamination cavity by the pilot charge injector, it is unreservedly possible to dilute the main charge with air and/or flue gas as long as this increases the efficiency of the thermal engine, without compromising the flammability of the pilot charge.

This decisive advantage derives from the fact that the lamination valve closes the lamination duct and isolates the lamination cavity of the combustion chamber of the engine during the pilot charge filling of the valve ignition prechamber, then forms, at the time of lighting the main charge, a torch-ignition prechamber to emit ignition torches in the said combustion chamber.

This preserved integrity of the pilot charge shall be decisive for its combustion stability, to ensure in all circumstances that the emission of ignition torches into the combustion chamber of the engine occurs at the appropriate time, with minimal temporal dispersion from cycle to cycle.

In addition, the invention described in patent application FR 17 50264 allows the amount of pilot charge introduced by the pilot charge injector into the lamination cavity to be freely adjustable. It is thus possible to adapt the power of the ignition torches emitted to the speed and load of the internal combustion engine and to the dilution ratio of its main charge. This new possibility makes it possible to maximize the efficiency of the engine in all circumstances.

In conclusion, the valve ignition prechamber, which is the subject of patent application No. 3 061 743, differs from the ignition prechambers according to the prior art in that it ensures a great temporal stability of the ignition of the main charge whatever the speed and load of the internal combustion engine, the power of the said ignition being freely adjustable and adaptable to the dilution rate with air or recirculated exhaust gases of the main charge, and this whatever the liquid or gaseous fuel consumed by the said engine.

It should be noted that, as an improvement, the lamination valve can advantageously be magnetically returned on its seat by a permanent magnet or an electromagnet, this in application of the invention entitled "magnetic valve return device" described in patent application No. 18 58111 of Sep. 10, 2018 owned by the applicant.

When an electromagnet is provided in application of the foregoing, it becomes possible, firstly, depending on the speed of the heat engine, to return or not return the lamination valve towards its valve closing seat in order to close or not close the lamination conduit, and, secondly, to adjust the force that returns said valve to said seat.

This adjustment of the return force of the said valve on its seat makes it possible, in particular, to guarantee a rapid cold start of the spark-ignition internal combustion engine which receives the valve ignition prechamber. This is a major advance because a problematic cold start is one of the main obstacles to the adoption of ignition prechambers on mass-produced automobile engines.

Adjusting the force that returns the lamination valve of its valve seat allows, among other things, to adjust the pressure reached in the valve ignition prechamber before the ignition of the pilot charge it contains.

This adjustment makes it possible, for example, not to exceed the saturating vapor pressure beyond which part of the gasoline contained in the pilot charge condenses and returns to the liquid phase, to the point that the charge can no longer be ignited by the spark produced by the spark plug.

Ensuring that this pressure is not exceeded means guaranteeing the starting of the internal combustion engine in all circumstances, and in particular at cold and low temperatures.

The adjustment of the return force of the lamination valve on its valve closure seat also makes it possible to introduce a pilot charge into the ignition prechamber no longer via the pilot charge injector, the latter remaining closed, but via the gas ejection orifices, said pilot charge then being formed from the gases constituting the main charge which are undiluted during this phase.

This latter strategy allows in particular the rapid restart of the heat engine after a prolonged shutdown, in particular by making it possible to dispense with the compression means described in patent application FR 17 50264 during the first seconds after starting said engine, and this as long as said means are not yet able to deliver the pilot charge into the valve ignition prechamber.

Despite the many advantages of the valve ignition prechamber according to patent application FR 17 50264, whether or not completed with its magnetic valve return device according to patent application No. 18 58111, said prechamber has the drawback of an architecture that is not very conducive to complete combustion of the pilot charge before it is ejected into the combustion chamber of the engine via the gas ejection orifices.

Indeed, the geometrical constraints of implantation of the valve prechamber in the cylinder head of internal combustion engines require the spark plug to be positioned away from the gas ejection orifices, said spark plug being more often positioned opposite said orifices. This is all the more true for compact engines used in automobiles.

As a result of this arrangement, when the combustion of the pilot charge is initiated in the lamination cavity by the spark plug, a large part of said charge is ejected into the combustion chamber of the engine in the form of fresh gas not yet burnt and unable to ignite the main charge.

Indeed, in the lamination cavity, the gases which are near the spark plug naturally burn first. As the temperature of said gases increases, their volume also increases while their density decreases. The volumetric expansion of said gases drives out of the prechamber and via the gas ejection orifices the unburnt gases contained in the lamination duct and located near said orifices.

The flame must therefore have developed from the spark plug to the gas ejection orifices so that the first hot gases capable of igniting the main charge are finally ejected via said orifices.

Finally, only a small part of the pilot charge which resided in the valve ignition prechamber at the time of its ignition by the spark plug is expelled from said prechamber in the form of ignition torches consisting of hot gases suitable for igniting the main charge.

If, on the contrary, combustion would begin with the gases located near the gas ejection orifices, the entire pilot charge would be ejected into the combustion chamber of the engine in the form of hot gases, giving said charge much higher ignition power. But this is not the case.

The counterproductive nature of the direction of combustion imposed by the position of the spark plug is very damaging to the ignition efficiency of the valve prechamber according to patent application FR 17 50264.

In the particular context of the invention described in the said application, the fact that the spark plug is by necessity situated opposite the discharge orifices of the torch may indeed lead to an absence of ignition of the main charge in the combustion chamber of the engine.

This may occur in particular if the pilot charge introduced into the ignition prechamber proves insufficient without it being possible to increase it given the particular operation of the lamination valve and the pilot charge injector with which it cooperates.

Because, when the pilot charge is ignited, because of the lamination valve, the pressure of the pilot charge is lower than that of the main charge. Therefore, in order for the ignition prechamber to emit ignition torches in the combustion chamber, following the combustion of the pilot charge, the pressure in the lamination chamber must rise sufficiently to reach and then exceed the pressure in the combustion chamber of the engine.

If, from this exceeding, an excessive proportion of the gases constituting the pilot charge is emitted in an unburnt form in the combustion chamber, it may not be possible to emit in the chamber hot ignition torches formed from high temperature flue gases.

Even if this extreme case is not reached, in all cases, the start of the flame initiated by the spark plug being axially positioned opposite the ejection orifices of the torches, the average temperature of the gases ejected into the combustion chamber of the engine is decreased, as is the pressure difference between the prechamber and the said combustion chamber when the ignition torches are ejected through the said orifices.

The resulting ignition torches are therefore less efficient at penetrating the three-dimensional space of the combustion chamber of the thermal engine, generating lower local turbulence of the main charge, and emitting less ignition heat energy.

Another problem inherent in the ignition prechamber according to patent application FR 17 50264 is the power imbalance observed between the different ignition torches emitted in the combustion chamber.

Indeed, when the pilot charge is ignited by the spark plug, given the small size of the lamination cavity and the lamination duct with which it cooperates, the development of pilot charge combustion from the spark plug produces temperature heterogeneities in the lamination duct.

The said heterogeneities result in temperature differences between the emitted ignition torches, and therefore in differences in the viscosity of the gases emitted from one ignition torch to another.

These differences lead to significant power differences between the emitted ignition torches, which is unfavorable to a harmonious development of combustion in the engine combustion chamber.

Indeed, certain zones of the combustion chamber are slower to burn than others and therefore more sensitive to knocking and more productive of unburned gases and pollutants.

This harms both the efficiency of the heat engine and its cleanliness, its polluting emissions being increased because of the imbalances just described.

In order to remedy these disadvantages, the valve ignition prechamber with a reversed direction of combustion according to the invention mainly tends to reverse the direction of propagation of combustion in the pilot charge so that a significant part of said combustion starts in the lamination duct and in the vicinity of the gas ejection orifices, then rises towards the lamination cavity, and this, without calling into question the position of the spark plug.

Also in order to homogenize the temperatures of the different ignition torches emitted into the combustion chamber, the valve ignition prechamber with a reversed direction of combustion according to the invention allows homogeneous combustion of the pilot charge in the lamination duct.

Thus, the valve ignition prechamber with a reversed direction of combustion according to the invention allows in particular:

To drastically limit the part of the pilot charge emitted by the valve ignition prechamber in the engine combustion chamber in the form of unburnt gas;

To increase the average temperature of the ignition torches emitted by the valve ignition prechamber in the combustion chamber of the engine, and therefore, to increase the efficiency of said torches in igniting the main charge;

To eliminate any risk of failure to ignite the main charge on the grounds that the special operation of the lamination valve and the pilot charge injector makes it impossible to emit ignition torches consisting of hot gases in the combustion of the engine;

To significantly reduce the burn time of the pilot charge in the valve ignition prechamber, which has the effect of reducing the amount of heat exported from the hot gases resulting from said combustion to the inner walls of said prechamber;

For the same amount of energy contained in the pilot charge, to increase the pressure difference between the valve ignition prechamber and the engine combustion chamber during the combustion of the pilot charge, and to make the ignition torches emitted in the said combustion chamber more penetrating and turbulent;

To reduce the amount of pilot charge to be injected into the valve ignition prechamber for the same main charge ignition efficiency;

To balance the power of the ignition torches emitted into the combustion chamber by the torch prechamber, including limiting the maximum temperature difference between the torches.

The valve ignition prechamber with a reversed direction of combustion according to the invention is intended to be inexpensive to manufacture in mass production, in order to remain compatible with the economic constraints of most of the applications for which it is intended, including automobiles.

Understandably, the valve ignition prechamber with a reversed direction of combustion according to the invention may be applied to any rotary or reciprocating internal combustion engine of any type, regardless of the gaseous, liquid or solid fuel it consumes, and whether its main charge is diluted with previously cooled or uncooled exhaust gases or not, with a neutral gas of any kind, or with a gas rich in oxygen or any other combustive agent.

It is also to be understood that the pilot charge intended to ignite the main charge of any spark-ignition engine that is equipped with the valve ignition prechamber with a reversed direction of combustion according to the invention may contain a fuel and/or combustive agent different to a fuel and/or combustive agent that constitutes the main charge.

The valve ignition prechamber with a reversed direction of combustion is provided for an internal combustion engine which has a cylinder head that covers a cylinder to form a combustion chamber in which a main charge can be burned, said prechamber comprising:

- At least one lamination cavity which is arranged in the cylinder head and which is connected to the combustion chamber by a lamination duct;
- A pilot charge injector which opens into the lamination cavity to inject therein a pilot charge consisting of an easily flammable combustive agent-AF fuel mixture;
- A lamination valve which can either close the lamination duct so that the latter no longer communicates with the combustion chamber, or open said duct to form with the latter a torch-ignition prechamber which simultaneously communicates, on the one hand, with the lamination cavity via the lamination duct, and, on the other hand, with the combustion chamber via at least one gas ejection orifice in order to emit an ignition torch into said chamber;
- At least one inverter housing housed in the lamination cavity, said housing forming between itself and said cavity a late combustion volume while an ignition pilot charge can be introduced into said housing;
- Ignition means which open inside the inverter housing to ignite the ignition charge;
- At least one main ejection nozzle that connects the inside of the inverter housing with the inside of the lamination cavity, said nozzle producing during the combustion of the ignition pilot charge a pre-ignition torch which can penetrate in whole or in part into the lamination duct, the volume swept by said torch constituting an early combustion volume.

The valve ignition prechamber with a reversed direction of combustion according to the present invention comprises ignition means consisting of a positive electrode and a negative electrode of an ignition spark plug.

The valve ignition prechamber with a reversed direction of combustion according to the present invention includes an inverter housing that is integral with the spark plug.

The valve ignition prechamber with a reversed direction of combustion according to the present invention comprises ignition means which consist of a positive electrode of a spark plug, the inner wall of the inverter housing constituting a negative electrode.

The valve ignition prechamber with a reversed direction of combustion according to the present invention comprises a smaller existing distance between the inner wall of the inverter housing and the positive electrode located in the vicinity of the main ejection nozzle.

The valve ignition prechamber with a reversed direction of combustion according to the present invention comprises an inside of the inverter housing that forms an annular chamber.

The valve ignition prechamber with a reversed direction of combustion according to the present invention comprises a main ejector nozzle, which comprises, successively and in the direction of the outlet of the inverter housing comprises a convergent, a throat and a divergent.

The valve ignition prechamber with a reversed direction of combustion according to the present invention includes a main ejector nozzle that ends with a nozzle extender which forms a protrusion to extend the outer face of the inverter housing in the direction of the lamination duct.

The valve ignition prechamber with a reversed direction of combustion according to the present invention comprises a main ejection nozzle which is eccentric relative to the longitudinal axis of the lamination cavity.

The valve ignition prechamber with reversed direction of combustion according to the present invention comprises a main ejection nozzle which is fully or partially oriented tangentially to the inner wall of the lamination cavity.

The valve ignition prechamber with a reversed direction of combustion according to the present invention comprises at least one secondary ejection nozzle which connects the inside of the inverter housing with the inside of the lamination cavity, said nozzle being capable to emit a secondary turbulence torch into the late combustion volume.

The valve ignition prechamber with a reversed direction of combustion according to the present invention comprises a secondary ejection nozzle that is oriented approximately tangentially to the inner wall of the lamination cavity.

The valve ignition prechamber with a reversed direction of combustion according to the present invention comprises an internal volume of the inverter housing plus the internal volume of the lamination duct which is less than half of the total internal volume formed together by the lamination cavity including the internal volume of the inverter housing, and the lamination duct.

The valve ignition prechamber with a reversed direction of combustion according to the present invention comprises a lamination valve which is made of a magnetic material, while a magnetic field source integral with the cylinder head produces a magnetic field which attracts the said valve and tends to hold it pressed against the end of the lamination duct in order to close the latter.

The description that follows, in conjunction with the appended drawings and supplied as non-limiting examples, will allow a better understanding of the invention, the characteristics thereof, and the advantages it is likely to provide:

FIG. 1 is a schematic sectional view of the valve ignition prechamber with a reversed direction of combustion according to the invention as it can be installed in an internal combustion engine, the inverter housing being integral with the spark plug.

FIG. 2 is a schematic, close-up sectional view of the valve ignition prechamber with a reversed direction of combustion according to the invention, and according to the embodiment shown in FIG. 1, focused on the spark plug, the lamination cavity and the lamination channel.

FIG. 3 is a schematic, close-up sectional view of the valve ignition prechamber with a reversed direction of combustion according to the invention and according to the embodiment shown in FIG. 1, focused on the spark plug, the lamination cavity and the lamination channel, and which illustrates the operation of the said valve ignition prechamber when the ignition pilot charge contained in the inverter housing is ignited by the spark plug.

FIG. 4 is a close-up schematic sectional view of the valve ignition prechamber with a reversed direction of combustion according to the invention and according to the embodiment shown in FIG. 1, focused on the spark plug, the lamination cavity and the lamination duct, and which illustrates the operation of the said ignition prechamber immediately after the ignition charge has been partially ejected from the inverter housing via the ejection nozzle, wherein the combustion spreads to the entire pilot charge contained in the lamination cavity and lamination duct.

FIG. 5 is a close-up schematic sectional view, focused on the inverter housing, and which shows a variant of the valve ignition prechamber with a reversed direction of combustion according to the invention according to which the ejection nozzle comprises a convergent, a throat, and a divergent, and ends with a nozzle extension which forms a protuberance to extend the outer face of the inverter housing in the direction of the gas ejection duct.

FIG. 6 is a sectional view of the valve ignition prechamber with a reversed direction of combustion according to the invention that can equip an internal combustion engine, said prechamber being housed in the cylinder head of said engine by means of an insert, the inverter housing being integral with the spark plug, and the lamination valve being held pressed against the end of the gas ejection duct by a magnetic field produced by a permanent magnet.

FIG. 7 is a three-dimensional sectional view of the valve ignition prechamber with a reversed direction of combustion according to the invention, according to the variant shown in FIG. 6.

FIG. 8 is a three-dimensional sectional view of the insert shown in FIG. 6 which receives in particular the spark plug and the lamination valve while the pilot charge injector opens into the lamination cavity arranged in said insert, the spark plug ignition being integral with an inverter housing shown in cutaway and which comprises a main ejection nozzle which emits a pre-ignition torch, and two secondary ejection nozzles which each emit a secondary turbulence torch.

DESCRIPTION OF THE INVENTION

FIGS. 1 to 8 show the valve ignition prechamber 1 with a reversed direction of combustion according to the invention, various details of its components, its variants, and its accessories.

As can be seen in FIGS. 1 and 7, the valve ignition prechamber 1 with a reversed direction of combustion according to the invention is housed in a cylinder head 3 of an internal combustion engine 2, said cylinder head 3 covering a cylinder 4 to form with a piston 31 a combustion chamber 5.

As shown in FIGS. 1 to 4 and FIGS. 6 and 7, a main charge 30 can be introduced into the combustion chamber 5.

FIGS. 1 to 8 show that the valve ignition prechamber 1 with a reversed direction of combustion according to the invention has at least one lamination cavity 6 which is arranged in the cylinder head 3 and which is connected to the combustion chamber 5 by a lamination duct 7.

FIGS. 1 to 8 also show that a pilot charge injector 32 opens into the lamination chamber 6 to inject therein a pilot charge 9 consisting of a highly flammable combustive agent-AF fuel mixture.

FIGS. 1 to 4 and FIGS. 6 to 8 show that the valve ignition prechamber 1 with a reversed direction of combustion according to the invention includes a lamination valve 13 which may either close the lamination duct 7 so that the latter no longer communicates with the combustion chamber 5, or open said duct 7 to form with the latter a torch-ignition prechamber 23 which communicates simultaneously, on the one hand, with the lamination cavity 6 via the lamination duct 7, and, on the other hand, with the combustion chamber 5 via at least one gas ejection orifice 24 to emit in said chamber 5 an ignition torch 29.

The inverter housing 93 of the valve ignition prechamber 1 with a reversed direction of combustion according to the invention can be seen in FIGS. 1 to 8, said housing 93 being contained in the lamination cavity 6 and forming between it and said cavity 6 a late combustion volume 100 while an ignition pilot charge 27 may be introduced into said housing 93.

It should be noted that, as a particular embodiment of the valve ignition prechamber 1 with a reversed direction of combustion according to the invention, the ignition pilot charge 27 may be introduced into the inverter housing 93 either by the main ejection nozzle 94, whereby said charge 27 is subtracted from the pilot charge 9 when introduced into the said housing 93 by the pilot charge injector 32, or by an ignition charge injector, not shown, which can inject said charge 27 into said housing 93 for example through one or more radial holes which are arranged into the base of the spark plug 12 and which are connected to the said injector by a conduit, like the device described in patent application WO 2013/117857 A3, the original French application of which had been filed by the applicant.

Ignition means 11 which comprises the valve ignition prechamber 1 with a reversed direction of combustion according to the invention can be seen in FIGS. 1 to 8, said means 11 opening into the inverter housing 93 to ignite the ignition charge 27, and which may consist of a spark plug 12, a laser beam, a microwave or plasma source, or any type of ignition means known to the skilled person.

FIGS. 1 to 8 also show a main ejection nozzle 94 which comprises the valve ignition prechamber 1 with a reversed direction of combustion according to the invention, said nozzle 94 connecting the inside of the inverter housing 93 with the inside of the lamination cavity 6.

It can be seen in FIG. 3 that during combustion of the ignition pilot charge 27, the main ejection nozzle 94 produces a pre-ignition torch 33 which can penetrate in whole or in part into the lamination duct 7, the volume swept by said torch 33 constituting an early combustion volume 101.

As an alternative, the main ejection nozzle 94 may be substantially eccentric with respect to the longitudinal axis of the lamination duct 7 to direct the hot gases resulting from the combustion of the ignition pilot charge 27 indirectly into said duct 7. It should also be noted that one or more additional main ejection nozzles 94 may be made and oriented in various other directions.

It should be noted that according to a particular embodiment of the valve ignition prechamber 1 with a reversed direction of combustion according to the invention, the ignition means 11 may consist of a positive electrode 95 and a negative electrode 96 of a spark plug 12.

As a particular embodiment of the valve ignition prechamber 1 with a reversed direction of combustion according to the invention, the positive electrode 95 and the negative electrode 96 of the spark plug 12 can be approximately coplanar, in the same way as the electrodes of semi-surface discharge spark plugs known per se.

This allows the fresh gases introduced into the inverter housing 93 via the main ejection nozzle 94 to be sprayed directly onto the electrodes 95, 96 and prevents sparks from being produced between the positive electrode 95 and the inner wall of the inverter housing 93.

It should be noted that, as shown in FIGS. 1 to 8, the inverter housing 93 can be integrated with the spark plug 12, the said housing 93 being attached to the nose of the said spark plug 12 by screwing, welding, crimping or by any other attachment means known to skilled person.

FIGS. 1 to 8 show that the ignition means 11 can consist of a positive electrode 95 on a spark plug 12, the inner wall of the inverter housing 93 constituting a negative electrode 96. In this case, and as a variant in the design of the valve ignition prechamber 1 with a reversed direction of combustion according to the invention, at least one pin or protuberance can be provided which emerges from the inner wall of the inverter housing 93 and which is sufficiently close to the positive electrode 95 to ensure that the ignition spark always occurs between said positive electrode 95 and said pin or protuberance.

FIGS. 1 to 8 also show that advantageously, the smallest distance between the inner wall of the inverter housing 93 and the positive electrode 95 can be located in the vicinity of the main ejection nozzle 94 so that when a high voltage current is applied to the positive electrode 95, a spark is produced between said electrode 95 and said vicinity, which has the effect of initiating the combustion of the ignition pilot charge 27 at the said vicinity and forcing the majority of the gases constituting the ignition pilot charge 27 contained in the inverter housing 93 to burn before being expelled from the said housing 93 via the main ejection nozzle 94.

Thus, the ability of the ignition pilot charge 27 to ignite the pilot charge 9 contained in lamination cavity 6 and lamination duct 7 is increased.

According to a particular embodiment of the valve ignition prechamber 1 with a reversed direction of combustion according to the invention, the inner wall of the inverter housing 93 may be partially covered with an electrically insulating coating for avoiding the formation of a spark in areas outside the vicinity of the main ejection nozzle 94. In this case, the smallest distance existing between the inner wall of the inverter housing 93 and the positive electrode 95 may no longer be located in the vicinity of the main ejection nozzle 94.

In FIGS. 1 to 8, it can be noted that the inside of the inverter housing 93 can form an annular chamber 34 which can understandably be designed as toroidal, funnel-shaped, more or less flattened or pot-bellied, or as having any revolution form.

FIG. 5 shows that the main ejection nozzle 94 may include, successively and in the direction of the exit from the inverter housing 93, a convergent 97, a throat 98 and a divergent 99.

This particular configuration makes it possible to accelerate the gases constituting the initiating pilot charge 27 when they are ejected from the inverter housing 93 via the main ejection nozzle 94, possibly at a supersonic speed, which a simple orifice does not allow, and allows said gases to penetrate as deeply as possible inside the lamination duct 7.

In addition, FIG. 5 shows that the main ejection nozzle 94 may end with a nozzle extension 28 which forms a protrusion to extend the outer face of the inverter housing 93 in the direction of the lamination duct 7.

It is observed that the nozzle extender 28 increases the late combustion volume 100 while reducing the early combustion volume 101, this by bringing the outlet of the main ejection nozzle 94 closer to the lamination duct 7, or even by introducing more or less deeply the said outlet in the said duct 7.

This particular configuration of the valve ignition prechamber 1 with a reversed direction of combustion according to the invention increases the efficiency of the pre-ignition torch 33 to ignite the part of the pilot charge 9 contained in the lamination duct 7 before that not yet burned contained in the lamination cavity 6.

It should be noted that according to the valve ignition prechamber 1 with a reversed direction of combustion according to the invention, the main ejection nozzle 94 can be eccentric relative to the longitudinal axis of the lamination cavity 6 to produce turbulent gas motion in the form of a roller better known as "tumble", said movement occurring in the lamination cavity 6 during the emission by said nozzle 94 of the pre-ignition torch 33.

Alternatively, the main ejection nozzle 94 can also be fully or partially oriented tangentially to the inner wall of the lamination cavity 6 in order to give the gas that it contains a turbulent movement in the form of a tourbillon, better known as "swirl", said movement occurring in the lamination cavity 6 when the pre-ignition torch 33 is emitted by the main ejection nozzle 94.

As shown in FIG. 8, at least one secondary ejection nozzle 102 may be provided which connects the inside of the inverter housing 93 with the inside of the lamination cavity 6, said nozzle 102 being capable of emitting a secondary turbulence torch 103 in the late combustion volume 100, which has the effect of accelerating the combustion of the part of pilot charge 9 contained in said volume 100.

Moreover, FIG. 8 shows that the secondary ejection nozzle 102 can be oriented tangentially to the inner wall of the lamination cavity 6, which has the effect of producing a turbulent movement in the form of a tourbillon, known as the "swirl", said movement occurring, on the one hand, in the inverter housing 93 during its filling with the ignition pilot charge 27 via the secondary ejection nozzle 102, and, on the other hand, in the lamination cavity 6 when the said nozzle 102 emits a secondary turbulence torch 103 in said cavity 6.

It should be noted that according to the valve ignition prechamber 1 with a reversed direction of combustion according to the invention, the internal volume of the inverter housing 93 plus the internal volume of the lamination duct 7 can advantageously represent less than half of the total internal volume formed together by the lamination cavity 6, including the internal volume of the inverter housing 93, and the lamination duct 7.

As shown in FIGS. 1, 2, 6, 7, and 8, the lamination valve 13 can be made of magnetic material 43, while a magnetic field source 44 attached to the cylinder head 3 produces a magnetic field that attracts the lamination valve 13 and tends to hold it pressed against the end of the lamination duct 7 so as to close the lamination duct 7.

As a non-limiting example shown in FIGS. 1, 2, 6, 7 and 8, the source of magnetic field 44 can be a permanent magnet 53, which can however be advantageously replaced by an electromagnet controlled by a computer.

Operation of the Invention

The operation of the valve ignition prechamber 1 with a reversed direction of combustion according to the invention is easily understood by looking at FIGS. 1 to 8 which show examples of non-limiting embodiments of the invention.

Particularly in FIGS. 1 and 7, it is seen that the valve ignition prechamber 1 with reversed direction of combustion is arranged in a cylinder head 3 of an internal combustion engine 2, the latter representing the main field of application of said prechamber 1 according to the invention.

It can be seen in FIGS. 1 and 7 that cylinder head 3 covers a cylinder 4 to form, together with a piston 31, a combustion chamber 5 into which a main charge 30 can be introduced, while a pilot charge 9 can be introduced into the lamination cavity 6 via a pilot charge injector 32.

It is to be noted in FIG. 4 that when the lamination valve 13 has opened the lamination duct 7 to form therewith a torch ignition prechamber 23, the lamination cavity 6 communicates with the combustion chamber 5 via said duct 7 and via gas ejection orifices 24 that open into said chamber 5 via a prechamber nose 75, in order to emit ignition torches 29 into said chamber 5.

It is also to be noted in FIGS. 1 to 8 that the lamination valve 13 is magnetically returned to its seat by a permanent magnet 53 that, as a variant, could be replaced by an electromagnet controlled by a computer.

In addition, FIGS. 1 to 8 show that the valve ignition prechamber 1 with a reversed direction of combustion is housed in the cylinder head 3 by means of a cylindrical insert body 70, itself housed in an insert well 72 arranged in said cylinder head 3 and this, in application of the invention described in French patent application No. 1904961 dated May 13, 2019 relating to an ignition insert with active prechamber, said application being owned by the applicant.

In FIGS. 6 to 8, there is shown a pilot charge injector 32 which consists in particular of a tubular injection nozzle 17 in which is housed an injection valve 18, said injector 32, as shown, forming part of a cam hydraulic injection system which was the subject of French patent application No. 1908158, dated Jul. 18, 2019, owned to the applicant.

It is noted in FIGS. 1 to 8 that by way of non-limiting exemplary embodiment of the valve ignition prechamber 1 with a reversed direction of combustion according to the invention, the ignition means 11 consist of a spark plug 12.

In FIGS. 1 to 8, it is noted that the positive electrode 95 of the spark plug 12 cooperates with the inner wall of the inverter housing 93 which forms a negative electrode 96, an ignition spark being able to be produced between said electrodes 95, 96.

It can be understand in view of FIGS. 1 to 8 that the objective of the valve ignition prechamber 1 with a reversed direction of combustion according to the invention is to ensure that a significant major part of the pilot charge 9 has burnt in the lamination cavity 6 and the lamination duct 7 before being ejected into the combustion chamber 5 in the form of ignition torches 29 made of hot gases having a strong turbulence.

In other words, the valve ignition prechamber 1 with a reversed direction of combustion ensures that the pilot charge 9 is ejected into the combustion chamber 5 mainly in the form of ignition torches 29 consisting of burnt gases brought to high temperature, and not consisting of fresh unburnt gas unable to ignite the main charge 30.

Indeed, the valve ignition prechamber 1 with a reversed direction of combustion according to the invention makes it possible to achieve the result which has just been explained despite the unfavorable position of the spark plug 12 which, from due to the various constraints of implantation of the lamination cavity 6 and of the lamination duct 7 in the internal combustion engine 2, is located very far from the gas ejection orifices 24.

Without the inverter housing 93, which, among other components, the valve ignition prechamber 1 with a reversed direction of combustion according to the invention, the combustion of the pilot charge 9 would develop in the lamination cavity 6 from the spark created by the spark plug 12, layer of gas after layer of gas, by progressing gradually in the internal volume of the said cavity 6 and then in the internal volume of the lamination duct 7, until reaching the gas ejection orifices 24.

The result of this development of combustion would be that a large part of the pilot charge 9 would be expelled into the combustion chamber 5 in the form of ignition torches 29, made up of too many fresh gases still not burned that have no power to ignite the main charge 30.

Therefore, in the absence of the particular configuration of the valve ignition prechamber 1 with a reversed direction of combustion according to the invention, it would be necessary to compensate for the too low ignition power of the ignition torches 29 emitted in the combustion chamber 5.

This compensation could be achieved, for example, by increasing the total internal volume that the lamination cavity 6 and the lamination duct 7 form together. However, this volume would become more difficult to fill with the required amount of pilot charge 9, because the time allowed for the pilot charge injector 32 to perform such filling is short, especially in the case of high-speed automotive engines.

Said compensation could also be done by injecting more pilot charge 9 into the same lamination cavity 6 using pilot charge injector 32. However, apart from the difficulty of filling said cavity 6 within the time available, or even the impossibility of filling said cavity 6 due to an early opening of the lamination valve 13, this strategy would be energy-consuming because the compression means 10 would first have to pre-compress a larger amount of pilot charge 9. This would be to the detriment of the total efficiency of the internal combustion engine 2, which would be significantly reduced.

In order to avoid having recourse to the compensations that have just been exposed, which degrade the efficiency of the internal combustion engine 2, the valve ignition prechamber 1 with a reversed direction of combustion according to the invention is provided to maximize the part of the pilot charge 9 that is ejected via the gas ejection orifices 24 in the form of ignition torches 29 consisting of burnt gases, since only these gases brought to high temperature are capable of igniting the main charge 30.

It is to achieve this result that the valve ignition prechamber 1 with a reversed direction of combustion comprises an inverter housing 93 into which an ignition pilot charge 27 can be introduced, said housing 93 being contained inside the lamination cavity 6 to form between itself and said cavity 6 a late combustion volume 100.

As can easily be deduced from FIGS. 1 to 8, the ignition pilot charge 27 is formed when the pilot charge injector 32 introduces the pilot charge 9 into the lamination cavity 6.

Indeed, the ignition pilot charge 27 results from the transfer of part of the pilot charge 9 from the lamination cavity 6 to the inside of the inverter housing 93 via the main ejection nozzle 94 that connects said interior with the space left between the outer wall of said housing 93 and the inside of the lamination cavity 6.

It is to be noted in FIGS. 1 to 4 and FIGS. 6 to 8 that the inverter housing 93 is positioned near the axial end of lamination cavity 6 opposite the prechamber nose 75.

It is also to be noted in FIGS. 1 to 8 that the spark plug 12 opens into the inverter housing 93.

It can be seen in FIGS. 1 to 8 that the main ejection nozzle 94 is oriented in the direction of the lamination duct 7 in order to introduce in whole or in part a pre-ignition torch 33 inside the said duct 7, the volume swept by the said torch 33 forming an early combustion volume 101.

Thus, following the ignition of the ignition pilot charge 27 by the spark plug 12, as shown in FIG. 3, hot gases constituting said charge 27 are ejected at high speed from the inverter housing 93, via the main ejection nozzle 94, in the form of a pre-ignition torch 33, and towards the inside of the lamination duct 7.

As it grows, the pre-ignition torch 33 forms the early combustion volume 101 consisting of burnt gases brought to high temperature.

When the pre-ignition torch 33 reaches the inside of the lamination duct 7, the fresh gases constituting the pilot charge 9 contained in said duct 7 burn and this, even before the part of the pilot charge 9 contained in the late combustion volume 100 have time to do so.

Ejection in the direction of the lamination duct 7 of the pre-ignition torch 33 by the main ejection nozzle 94 following the ignition of the ignition pilot charge 27, and the gradual combustion of the charge pilot 9 layer by layer which results in the direction of the gas ejection orifices 24, are symbolized in FIG. 3 by dotted lines, the arrows symbolizing the flow of gases.

The combustion being engaged in the lamination duct 7, said combustion continues to propagate in said duct 7 until it reaches the gas ejection orifices 24. Provided the pre-ignition torch 33 emitted by the ejection nozzle main 94 is perfectly centered in the lamination duct 7, the combustion of the part of pilot charge 9 contained in said duct 7 is homogeneous.

Thus, no gas ejection orifice 24 receives gases that are on average hotter or colder than the other gas ejection orifices 24 with which it cooperates.

In addition, the flow rate of any gas ejection orifice 24 is not increased or decreased in comparison with that of the other gas ejection orifices 24 with which it cooperates by an off-center gas flow relative to the lamination duct 7.

These features ensure that the ignition torches 29 emitted into the combustion chamber 5 are indeed identical.

In parallel with the combustion in the direction of the gas ejection orifices 24, shown in FIG. 3, the combustion propagates in "reverse" in the direction of the inverter housing 93 as shown in FIG. 4, so as to burn the part of the pilot charge 9 contained in the late combustion volume 100. The propagation of said combustion is also symbolized in FIG. 4 by dotted lines, arrows symbolizing the flow of gases.

Thus, according to the example just given, the direction of combustion of the pilot charge 9 in the volume that together form the lamination cavity 6 and the lamination duct 7 has indeed been reversed, which is the objective of the valve ignition prechamber 1 with a reversed direction of combustion according to the invention.

In doing so, in addition to the very rapid combustion of the pilot charge 9 caused by the pre-ignition torch 33, a significant part of the gases constituting the pilot charge 9 was ejected into combustion chamber 5 via the gas ejection orifices 24, and in the form of ignition torches 29 whose power and composition are homogeneous from one torch 29 to another. Said torches 29, provided they are made of high-temperature flue gas, are fully effective in igniting the main charge 30.

It should be noted, however, that there may be advantages to ejecting part of the pilot charge 9 into combustion chamber 5 as fresh gas. In fact, these gases can form a corridor of fresh, highly flammable, gases in the main charge 30 when the latter is, for example, composed of a gas mixture that is difficult to ignite because it is strongly diluted with recirculated air or exhaust gases.

This method of lamination of the main charge 30 can effectively help to increase the combustion efficiency of the internal combustion engine 2.

Also, according to the valve ignition prechamber 1 with a reversed direction of combustion according to the invention, the part of the pilot charge 9 ejected into combustion chamber 5 in the form of high-temperature flue gases via ignition torches 29 can be adjusted by adjusting the orientation of the main ejection nozzle 94 in relation to the lamination duct 7, and/or by varying the geometry of the said nozzle 94 to emit a pre-ignition torch 33 that is more or less opened angularly.

In addition, the importance of the early combustion volume 101 relative to that of the late combustion volume 100 can be adjusted by varying the length of the main ejection nozzle 94, and more precisely the length of a nozzle extension 28 that can be added to nozzle 94 as shown in FIG. 5.

Indeed, the closer the nozzle extender 28 brings the outlet of the main discharge nozzle 94 closer to the lamination duct 7, or even makes the outlet enter the lamination duct 7, the greater the late combustion volume 100 tends to be compared to the early combustion volume 101.

A variant of the design of the valve ignition prechamber 1 with a reversed direction of combustion according to the invention may consist in providing one or more secondary ejection nozzles 102, in addition to the main ejection nozzle 94, as shown in FIG. 8.

In said FIG. 8, the reversing valve housing 93 has two secondary ejection nozzles 102 of substantially smaller diameter than the main ejection nozzle 94. The two said nozzles 102 are eccentric to the longitudinal axis of the lamination cavity 6, positioned diametrically opposite each other, and each emit a secondary turbulence torch 103 into the late combustion volume 100.

The two nozzles 102 are also oriented almost radially with respect to the longitudinal axis of the lamination cavity 6 and tangentially to the inner wall of the lamination cavity 6.

It results from this particular configuration of the valve ignition prechamber 1 with a reversed direction of combustion according to the invention that during the transfer of part of the pilot charge 9 from the lamination cavity 6 to the inside of the inverter housing 93 to constitute the ignition pilot charge 27, a swirling movement is carried out inside the said housing 93 which promotes rapid combustion of the ignition pilot charge 27.

Then, when, following its ignition by the spark plug 12, the initiating pilot charge 27 is emitted into the late combustion volume 100 in the form of secondary turbulence torches 103 by each of the secondary ejection nozzles 102, the said volume 100 is also ignited, while it is also subjected to a swirling motion.

This particular arrangement of the valve ignition prechamber 1 with a reversed direction of combustion according to the invention as shown in FIG. 8 prevents the combustion of the part of the pilot charge 9 contained in the late combustion volume 100 from participating too late in the emission of the ignition torches 29 into the combustion chamber 5.

It should be noted that the exemplary embodiment of the valve ignition prechamber 1 with a reversed direction of combustion according to the invention just described is not restrictive.

It should also be noted that the valve ignition prechamber 1 with a reversed direction of combustion according to the invention can be applied to other fields than that of internal combustion engines, such as that of gas nailers, firearms, or any other apparatus requiring the ignition of a main charge by means of a pilot charge with the best possible efficiency.

The possibilities of the valve ignition prechamber 1 with a reversed direction of combustion according to the invention are not limited to the applications just described and it must be understood that the preceding description is supplied only as an example and that it does not limit the field of the said invention from which one would not depart by replacing the details of execution described by any other equivalent.

The invention claimed is:

1. A valve ignition prechamber (1) with a reversed direction of combustion for an internal combustion engine (2) which has a cylinder head (3) which covers a cylinder (4) to form a combustion chamber (5) in which can be burned a main charge (30), characterized in that it comprises:

At least one lamination cavity (6) which is arranged in the cylinder head (3) and which is connected to the combustion chamber (5) by a lamination duct (7);

A pilot charge injector (32) which opens into the lamination cavity (6) to inject therein a pilot charge (9) consisting of an easily flammable Combustive agent-AF fuel mixture;

A lamination valve (13) which can either close the lamination duct (7) so that the latter no longer communicates with the combustion chamber (5), or open said duct (7) to form with the latter a torch-ignition prechamber (23) which simultaneously communicates, on the one hand, with the lamination cavity (6) via the lamination duct (7) and, on the other hand, with the combustion chamber (5) via at least one gas ejection orifice (24) to emit an ignition torch (29) into said chamber (5);

At least one inverter housing (93) housed in the lamination cavity (6), said housing (93) forming between itself and said cavity (6) a late combustion volume (100) while an ignition pilot charge (27) can be introduced into said housing (93);

Ignition means (11) that open inside the inverter housing (93) to ignite the ignition charge (27);

At least one main ejection nozzle (94) which connects the inside of the inverter housing (93) with the inside of the lamination cavity (6), said nozzle (94) producing during the combustion of the ignition pilot charge (27) a pre-ignition torch (33) which can penetrate in whole or in part into the lamination duct (7), the volume swept by said torch (33) constituting an early combustion volume (101).

2. The valve ignition prechamber with a reversed direction of combustion according to claim 1, characterized in that the ignition means (11) consists of a positive electrode (95) and a negative electrode (96) of an ignition spark plug (12).

3. The valve ignition prechamber with a reversed direction of combustion according to claim 2, characterized in that the inverter housing (93) is integral with the spark plug (12).

4. The valve ignition prechamber with a reversed direction of combustion according to claim 1, characterized in that the ignition means (11) consist of a positive electrode (95) of a spark plug (12), the inner wall of the inverter housing (93) constituting a negative electrode (96).

5. The valve ignition prechamber with a reversed direction of combustion according to claim 4, characterized in that the smallest distance existing between the inner wall of the inverter housing (93) and the positive electrode (95) is located in the vicinity of the main ejection nozzle (94).

6. The valve ignition prechamber with a reversed direction of combustion according to claim 1, characterized in that the inside of the inverter housing (93) forms an annular chamber (34).

7. The valve ignition prechamber with a reversed direction of combustion according to claim 1, characterized in that the main ejector nozzle (94) comprises, successively and in the direction of the outlet of the inverter housing (93), a convergent (97), a throat (98) and a divergent (99).

8. The valve ignition prechamber with a reversed direction of combustion according to claim 1, characterized in that the main ejection nozzle (94) ends with a nozzle extender (28) which forms a protrusion to extend the outer face of the inverter housing (93) in the direction of the lamination duct (7).

9. The valve ignition prechamber with a reversed direction of combustion according to claim 1, characterized in that the main ejector nozzle (94) is eccentric relative to the longitudinal axis of the lamination cavity (6).

10. The valve ignition prechamber with a reversed direction of combustion according to claim 9, characterized in that the main ejection nozzle (94) is fully or partially oriented tangentially to the inner wall of the lamination cavity (6).

11. The valve ignition prechamber with a reversed direction of combustion according to claim 1, characterized in that at least one secondary ejection nozzle (102) connects the inside of the inverter housing (93) with the inside of the lamination cavity (6), said nozzle (102) being capable to emit a secondary turbulence torch (103) into the late combustion volume (100).

12. The valve ignition prechamber with a reversed direction of combustion according to claim 11, characterized in that the secondary ejection nozzle (102) is oriented approximately tangentially to the inner wall of the lamination cavity (6).

13. The valve ignition prechamber with a reversed direction of combustion according to claim 1, characterized in that the internal volume of the inverter housing (93) plus the internal volume of the lamination duct (7) is less than half of the total internal volume formed together by the lamination cavity (6), including the internal volume of the inverter housing (93), and the lamination duct (7).

14. The valve ignition prechamber with a reversed direction of combustion according to claim 1, characterized in that the lamination valve (13) is made of a magnetic material (43) while a magnetic field source (44) integral with the cylinder head (3) produces a magnetic field which attracts said valve (13) and tends to keep it pressed against the end of the lamination duct (7) to close the latter.

* * * * *